United States Patent [19]

Kamada et al.

[11] Patent Number: 4,997,696
[45] Date of Patent: Mar. 5, 1991

[54] MAGNETIC RECORDING MEDIUM

[75] Inventors: Ko Kamada; Takeshi Kakuta; Noburo Hibino, all of Kanagawa, Japan

[73] Assignee: Fuji Photo Film Co., Ltd., Kanagawa, Japan

[21] Appl. No.: 560,633

[22] Filed: Jul. 31, 1990

[30] Foreign Application Priority Data

Jul. 31, 1989 [JP] Japan .................................. 1-198677

[51] Int. Cl.$^5$ .............................................. G11B 23/00
[52] U.S. Cl. .................................... 428/141; 428/329; 428/694; 428/900
[58] Field of Search ................ 428/141, 329, 694, 900

[56] References Cited

U.S. PATENT DOCUMENTS 4,680,217 7/1987 Kanesaki et al. .................... 428/480
4,720,412 1/1988 Katoh et al. .......................... 428/480

Primary Examiner—Paul J. Thibodeau
Attorney, Agent, or Firm—Sughrue, Mion, Zinn, Macpeak & Seas

[57] ABSTRACT

A magnetic recording medium comprising a non-magnetic support having thereon a magnetic layer composed of ferromagnetic iron oxide powder dispersed in a binder, wherein a value of $P_{10}$ of optical interference type three dimensional surface roughness on the magnetic layer side of the non-magnetic support is in the range of 15 to 35 nm, $Rmax/P_{10}$ is not higher than 2.8 and $P_{10}$ of the opposite side to the magnetic layer side is also in the range of 15 to 35 nm, wherein $P_{10}$(nm) represents the difference between an average height of the protrusions of 10 apices extracted in order of greatest height within an area 250 μm square and an average height of all apices within the same 250 μm square area and Rmax (nm) represents the difference between an uppermost height and a lowermost depth within the 250 μm square area.

12 Claims, 1 Drawing Sheet

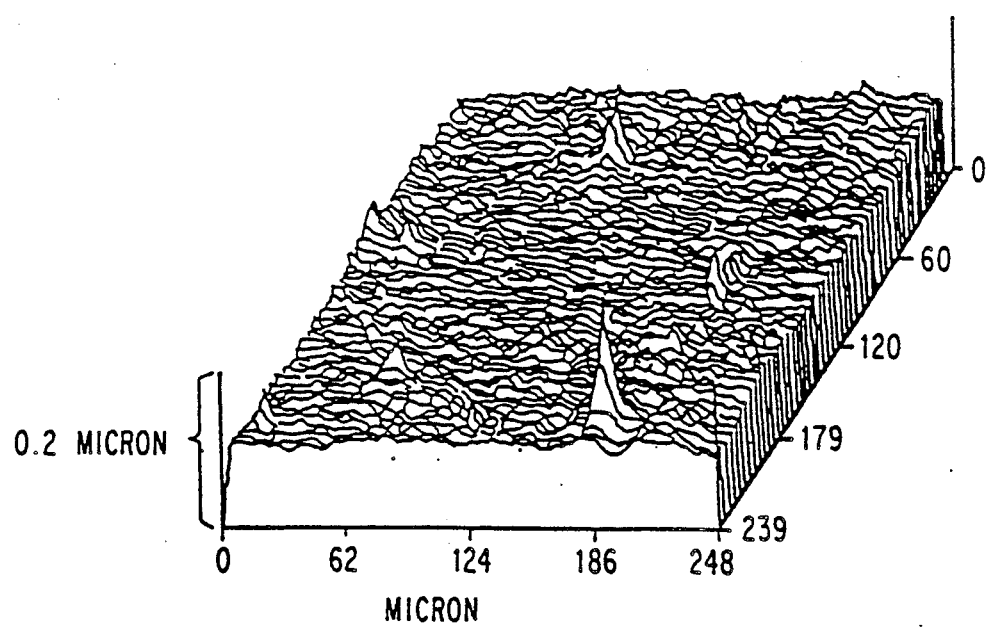

MAGNETIC RECORDING MEDIUM

FIELD OF THE INVENTION

This invention relates to a magnetic recording medium, and more particularly to a magnetic recording medium having greatly improved electromagnetic properties.

BACKGROUND OF THE INVENTION

With the development of magnetic recording mediums in recent years, high-density recording and high electromagnetic properties have been demanded. Yet, at the same time, running properties must be maintained at a satisfactory level. The provision of a smooth magnetic layer surface has been examined and calendering has been carried out towards this end in order to obtain good electromagnetic properties. On the other hand, the surfaces of magnetic recording mediums have been appropriately roughened by incorporating fillers in the back layers thereof in order to improve running properties.

In video tapes prepared by incorporating fine particles of ferromagnetic powder, for example, the latest S-VHS video tapes, surface designs for high-density recording are required and spacing loss to magnetic head must be reduced to the greatest extent possible. However, conventional ½" base films are too rough and electromagnetic properties are poor due to insufficient smoothness.

As a method for solving the roughness problem while maintaining adequate running properties, there is proposed a method wherein a base provided with a flat surface on both sides (Ra as measured with contact type roughness tester being not more than 0.005 $\mu$m) is used and a magnetic tape having a desired surface roughness is formed by manipulation of the compositions of the magnetic layer and the back layer. Base films for use in the production of such magnetic tape are described in JP-A-62-130848 (the term "JP-A" as used herein means an "unexamined published Japanese patent application"). However, since the base films are liable to be wrinkled or marred in the wind-up part of film-making stage, the yields of marketable base films are very low and, as a result, the manufacturing cost thereof is as high as 5 to 10 times that of ½ inch base films.

As alternative method for solving the above problems, dual surface films, wherein the face and the back of the films are different in surface roughness, are disclosed in JP-A-62-248131. However, it has been found that the surface roughness of the back layer side of the base film is too rough and hence the shape of the back layer is transferred to the surface of the magnetic layer during storage after winding-up, and, as a result, electromagnetic properties are lowered.

As described above, various attempts have been made to achieve high C/N (carrier to noise) for the video tapes by improving the surface profile of the magnetic layer. However, such prior attempts reveal a marked tendency to limit attention only to minimization of the Ra value of surface roughness (center line average surface roughness: JIS-B0601) with regard to the improvement of the surface profile of base film to be used. When the Ra value of the base film to be used is decreased, the output of the magnetic tape is improved. However, during handling in the manufacturing process, the integrity of the base is deteriorated and an increase in cost is incurred due to an avoidable lowering in yields. As can be appreciated from the foregoing discussion, the problem with regard to the optimization of the surface roughness of the base film cannot be easily solved by way of conventional proposed solutions. As a result, kinds of commercially available magnetic tapes for which high C/N is required are not considered to be fully satisfactory with respect to surface roughness. The description "kinds of magnetic tapes for which high C/N is required" as used herein refers to kinds of high band tapes such as S-VHS tapes.

The surface roughness of commercially available non-magnetic support film for conventional coating type magnetic tape was measured in the following manner. An area 250 $\mu$m square was measured with an optical interference type three-dimensional roughness tester, and the difference between (a) an average height of the protrusions of 10 apices extracted in order of greatest height within an area 250 $\mu$m square and (b) an average height of all apices within the 250 $\mu$m square area ($P_{10}$) was determined. On either side of the support film, $P_{10} \geq$ was determined to be at least 38 nm.

When Such a conventional base film is used, large protrusions present on the surface of the base film are replicated to some extent on the surface of the magnetic layer coated on the base film. As a result, spacing loss between magnetic head and magnetic tape is increased due to the surface unevenness and it is impossible to achieve high C/N.

$P_{10}$ of base films for vapor deposition is exceptional and as low as 1 to 10 nm. When ½ inch magnetic tapes are prepared by using such base films, sufficiently high C/N can be achieved as required for S-VHS video tape. However, the winding-up yields of the base films are very low, scratches are produced in the coating stage of the magnetic layer, and performance and yield are likely to be lowered. Hence, the production cost of the magnetic tapes which are the final products is increased.

It is demanded to provide a base film which can give high C/N and can be used for S-VHS without increasing the manufacturing cost of the magnetic tape.

SUMMARY OF THE INVENTION

An object of the present invention is to provide a magnetic recording medium which has improved electromagnetic properties and, in particular, high output and high C/N properties, without increasing the manufacturing cost of magnetic tape.

Another object of the present invention is to provide a magnetic recording medium suitable for use as high band S-VHS magnetic tape.

The above objects of the present invention have been achieved by providing a magnetic recording medium comprising a non-magnetic support having thereon a magnetic layer composed of ferromagnetic iron oxide powder dispersed in a binder, wherein a value of $P_{10}$ of optical interference type three-dimensional surface roughness on the magnetic layer side of the non-magnetic support is in the range of 15 to 35 nm, Rmax/$P_{10}$ is not higher than 2.8 and $P_{10}$ of the opposite side to the magnetic layer side is also in the range of 15 to 35 nm, wherein $P_{10}$ (nm) represents the difference between an average height of the protrusions of 10 apices extracted in order of greatest height within an area 250 $\mu$m square and an average height of all apices within the same 250 $\mu$m square area and Rmax (nm) represents the difference between an uppermost height and a lowermost depth within the 250 $\mu$m square area.

BRIEF DESCRIPTION OF THE DRAWING

The FIGURE is a bird's-eye view obtained by outputting surface roughness measured three-dimensionally with an optical interference type three-dimensional roughness tester as surface coordinate information within a micro-area.

DETAILED DESCRIPTION OF THE INVENTION

In the present invention, a magnetic recording medium having high C/N and high output can be obtained without increasing the manufacturing cost of magnetic tape by using a base film which is a relatively smooth-surfaced base having a $P_{10}$ value of 15 to 35 nm and has a not particularly high Rmax value and is therefore relatively uniform in terms of surface profile.

As a preferred embodiment, the above-described objects of the present invention can be achieved by providing a magnetic recording medium wherein the ferromagnetic iron oxide powder is a Co-containing iron oxide powder which is ferromagnetic powder having a coercive force (Hc) of 850 to 1200 Oe and a crystallite size of 200 to 400 Å.

Namely, the present invention provides a magnetic recording medium which is suitable for use as high band S-VHS magnetic tape and gives high output and high C/N without increasing the manufacturing cost thereof by using fine particles of Co-containing iron oxide having a high Hc in combination with the above-described base film.

In the present invention, $P_{10}$ and Rmax are values measured by an optical interference type three-dimensional roughness tester. The measured area is 0.25 mm square=0.06 mm$^2$.

The optical interference type three-dimensional roughness tester is provided by Prof. James C. Wyant of the Arizona State University (U.S.A) and measurements are made on the basis of measuring principles disclosed in U.S. Pat. No. 4,639,139 of Wyko Corporation. The basis of the output system is a surface roughness curve according to JIS-B0601, but information on surface coordinates within micro-area can be three-dimensionally outputted as a bird's-eye view (Figure). Tilt, waviness, etc. over the whole surface within a given length must be removed as described in JIS B0601 when surface roughness is measured. Since direct information on images of information obtained from optical interferometer contains tilt and waviness, the following three corrections are applied to coordinate information from images to remove tilt and waviness within the 250 μm square.

(1) Tilt Correction

When a plane is given, there is calculated a plane where the square root of average root-mean-square (RMS) of deviation of original signal coordinates from the given plane becomes the minimum. The coordinate values of the calculated plane are subtracted from the original signal coordinates at each point. These are referred to as the first corrected coordinates.

(2) Spherical Correction

When a spherical surface is given to the first corrected coordinates, there is calculated a spherical surface where RMS of deviation of the first corrected coordinates from said given spherical surface becomes the minimum. The coordinates values of the calculated spherical surface are subtracted from the first corrected coordinates. These are referred to as the second corrected coordinates.

(3) Cylindrical Correction

When a cylindrical surface having a central axis parallel to its central plane (additive average level of the whole points) is given to the second corrected coordinates, there is calculated a cylindrical surface where RMS of deviation of the second corrected coordinates from the given cylindrical surface becomes the minimums. These are referred to as the third corrected coordinates.

As discussed above, Rmax and $P_{10}$ are defined as follows;

Rmax: A space between the maximum value and the minimum value in the direction of Z axis (height) of the third corrected coordinates.

$P_{10}$: The average value of 10 points having larger values in the Z coordinates of the apices of the protruded area in a su face profile generated by the third corrected coordinates. The central plane in the Z coordinates is referred to as 0.

The reason behind the prescriptions for optical interference type three-dimensional surface roughness in particular as made in the present invention is that it is impossible for the relatively delicate surface roughness as in the present invention to be evaluated by using a contact type surface roughness tester. This is also clear from Japanese Patent Application No. 1-123696.

Examples of the non-magnetic support which can be used in the present invention include polyesters such as polyethylene terephthalate and polyethylene-2,6-naphthalate; polyolefins such as polyethylene and polypropylene; cellulose derivatives such as cellulose triacetate, cellulose diacetate, cellulose acetate butyrate and cellulose acetate propionate; vinyl resins such as polyvinyl chloride and polyvinylidene chloride; plastics such as polycarbonates, polyimides and polyamide-imides; non-magnetic metals such as aluminum, copper, tin and zinc or non-magnetic alloys containing these metals and stainless steel according to conventional usage; and paper materials, baryta paper in particular and paper coated or laminated with polymers of α-olefin having 2 to 10 carbon atoms such as polyethylene, polypropylene or an ethylene-butene copolymer.

Most preferred non-magnetic supports are those whose surface roughness on both sides is adjusted to a value within the desired range by incorporating inert inorganic or organic particles in the above plastic films.

Preferably, these inorganic or organic particles are fine spherical particles. It is preferred that particles having a relatively large size and particles having a relatively small size are used in combination. The particles having a large size have an effect of imparting winding characteristics and the particles having a small size have an effect of imparting easy lubrication.

The inert inorganic particles are generally called inorganic powder or abrasive. Examples of the inert inorganic particles include α-alumina, γ-alumina, silicon carbide, titanium oxide, magnesium oxide, iron phosphide, titanium carbide, α- and β-silicon oxides, aluminum, calcium oxalate, iron, α-ferrous oxide, zinc, zinc dioxide, nickel oxide, nickel, copper, chromia, magnesium hydroxide, zirconia, yttria, ceria, zircon and antimony oxide.

Examples of the organic fine particles include commercially available organic matting agents such as benzoguanamine formaldehyde and polytetrafluoroethylene. These particles have an average particle size of preferably 0.001 to 3 μm, more preferably 0.01 to 0.5 μm.

Coarse protrusion density can be reduced by removing coarse particles by means of filtration through a multi-stage filter after the addition of the particles. However, it is preferred that particles to be added contain no coarse particles, In view of this, α- and β-silicon oxides or organic fine particles are most preferred.

The amount of the particles to be added to the non-magnetic support material is such that a two-component system composed of 0.01 to 1.0 wt% of particles having a particle size of 0.1 to 1 μm and 0.005 to 1.0 wt% of particles having a particle size of 0.3 to 5.0 μm is most preferred.

In particular, $P_{10}$ can be controlled by the use of the particles having a particle size of 0.3 to 5.0 μm. That is, $P_{10}$ is in proportion to an average size of the particles having a particle size of 0.3 to 5.0 μm. Further, if the particle size distribution is narrow, $Rmax/P_{10}$ can be decreased.

When the above-described conditions are selected, the non-magnetic support of the present invention can be obtained wherein $P_{10}$ of optical interference type three-dimensional surface roughness of the magnetic layer side as well as the back side is in the range of 15 to 35 nm, preferably 20 to 30 nm, and $Rmax/P_{10}$ is in the range of 1.1 to 2.8. When $P_{10}$ is smaller than 15 nm, lubrication between films becomes poor, wind-up yield is reduced to lower than 70% and, as a result, the manufacturing cost of the base film is increased. On the other hand, when $P_{10}$ is larger than 35 nm, the surface of the magnetic layer becomes rough and C/N is lowered. When $Rmax/P_{10}$ is higher than 2.8, one or two large protrusions per an area 250 μm square are formed and C/N is lowered even when $P_{10}$ is a value within the range of 15 to 35 nm.

Ferromagnetic iron oxide powders which are used in the present invention are preferably Co-containing (including the form of deposition, dope or solid solution) iron oxide powders. Preferred examples thereof include Co-containing $\gamma$-$Fe_2O_3$, Co-containing $Fe_3O_4$ and Co-containing $FeO_x$ ($1.3 < x < 1.5$). The characteristics of the ferromagnetic powder are such that coercive force Hc in the magnetic layer is 850 to 1200 Oe, preferably 850 to 1000 Oe. When coercive force is lower than 850 Oe, output at 7 MHz is lowered, while when coercive force is higher than 1200 Oe, recording cannot be sufficiently made and there is a difficulty in erasing recording. The crystallite size of the powder is preferably 200 to 400 Å. When the crystallite size is smaller than 200 Å, the dispersibility of the ferromagnetic powder, becomes poor, the surface of the magnetic layer is roughened and output at 7 MHz is lowered, while when the crystallite size is larger than 400 Å, noise becomes high.

The amount of Co is preferably 1 to 10% by weight, particularly preferably 3 to 7% by weight per 100 parts by weight of ferromagnetic iron oxide.

It is preferred that the ferromagnetic powder is highly fillable fine particles having high Hc as described above to obtain the magnetic recording medium of the present invention It is preferred that high filling, that is, the maximum magnetic flux density Bm is at least 1600 gauss. When such ferromagnetic iron oxide powder and the above-described non-magnetic support are used in combination, high output and high C/N can be remarkably achieved and a magnetic tape suitable for S-VHS can be obtained without increasing the manufacturing cost thereof.

Binders which can be used in the present invention include conventional thermoplastic resins, thermosetting resins, reactive resins and mixtures thereof.

Thermoplastic resins having a softening temperature of not higher than 150° C., a weight-average molecular weight of 10,000 to 300,000 and a degree of polymerization of about 50 to 1,000 can be used. Examples of such thermoplastic resins include a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester acrylonitrile copolymer, a methacrylic ester-vinylidene chloride copolymer, a methacrylic ester-styrene copolymer, a urethane elastomer, a nylonsilicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (e.g., cellulose acetate butyrate, cellulose diacetate, cellulose triacetate, cellulose propionate, nitrocellulose), a styrene-butadiene copolymer, a polyester resin, a chlorovinyl ether-acrylic ester copolymer, an amino resin, various thermoplastic synthetic rubbers and mixtures thereof.

Among these thermoplastic resins, resins having at least one polar group selected from the group consisting of polar groups having the following formulas, $$-SO_3M, \quad -SO_2M, \quad -OSO_3M, \quad -COOM,$$

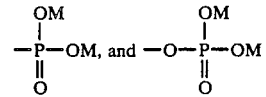

(wherein M is H, Li, Na or K) on the side chain thereof, particularly vinyl chloride copolymers having the polar group on the side chain are preferred. When these resins are used, the effects are remarkable.

Thermosetting or reactive resins which can be used in the present invention are resins having a weight-average molecular weight of 200,000 or less in the state of magnetic coating compositions and a molecular weight approaching infinity through condensation, addition or other polymerization reactions by heating after coating and drying. Of such resins, preferred are ones which do not soften or melt at temperatures lower than the thermal decomposition points thereof. Examples of such thermosetting or reactive resins include a phenolic resin, an epoxy resin, a thermosetting polyurethane resin, a urea resin, a melamine resin, an alkyd resin, a silicone resin, a reactive acrylic resin, an epoxy-polyamide resin, a nitrocellulose-melamine resin, a mixture of a high-molecular-weight polyester resin and an isocyanate prepolymer, a mixture of a methacrylate copolymer and a diisocyanate prepolymer, a mixture of a polyester polyol and a polyisocyanate, a urea-formaldehyde resin, a mixture of a low-molecular-weight glycol, a high-molecular-weight diol and triphenylmethane triisocyanate, a polyamine resin, and mixtures thereof.

The above-described resins can be used alone or in combination thereof as a binder, to which additives may be added. The amount of the binder is in the range of from 5 to 300 parts by weight per 100 parts by weight of the ferromagnetic particles.

Additives such as dispersant, lubricant, abrasive, antistatic agent, etc. may be added to the binder as well.

Examples of the polyisocyanates which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of the abovedescribed isocyanates with polyols; and polyisocyanates formed through condensation of isocyanates. Trade names of commercially available polyisocyanates of the above kinds include: Coronate L, Coronate HL, Coronate 2030, Coronate 2031, Millionate MR and Millionate MTL (manufactured by Nippon Polyurethane Co., Ltd., Japan); Takenate D-102, Takenate D-110N, Takenate D-200 and Takenate D-202 (manufactured by Takeda Chemical Industries, Ltd., Japan); and Desmodule L, Desmodule IL, Desmodule N, and Desmodule HL (Manufactured by Sumitomo Bayer Co., Ltd., Japan). These compounds can be used either alone or in a combinations thereof by utilizing a difference in curing reactivity.

Examples of the dispersant which can be used in the present invention are fatty acids having 10 to 22 carbon atoms of the formula $R_1COOH$ wherein $R_1$ is an alkyl group having 9 to 21 carbon atoms (such as caprylic acid, capric acid, lauric acid, myristic acid, palmitic acid, stearic acid, oleic acid, elaidic acid, linolic acid, linolenic acid, stearolic acid, etc.); metallic soaps prepared from alkali metal (Li, Na, K, for example) or alkaline earth metal (Mg, Ca, Ba, for example) or Cu, Pb, for example, of the above fatty acids; lecithin; and the like. Further, higher alcohols having 10 or more carbon atoms and sulfates and phosphates of the higher alcohols can also be used as the dispersants. The dispersant is used in an amount of 0.05 to 20 parts by weight per 100 parts by weight of the binder. The dispersant may be previously deposited on the surface of the ferromagnetic powder or the nonmagnetic fine powder or may be added during the dispersion stage.

Examples of the lubricant which ca be used in the present invention include silicone oil, graphite, molybdenum disulfide, boron nitride, graphite fluoride, fluorine-containing alcohols, polyolefins (e.g., polyethylene wax), polyglycols (e.g., polyethylene oxide wax), alkylphosphoric esters, polyphenyl ether, tungsten disulfide, fatty acid esters derived from a monobasic fatty acid having 10 to 20 carbon atoms and a monohydric alcohol having 3 to 12 carbon atoms or at least one of di-, tri-, tetra- and hexahydric alcohols having 3 to 12 carbon atoms and fatty acid esters derived from a monobasic fatty acid having 10 or more carbon atoms and an alcohol having 1 to 6 hydroxyl groups (the sum total of carbon atoms in said fatty acid and said alcohol being 11 to 28). Further, fatty acids, fatty acid amides and aliphatic alcohols can also be used as the lubricants, each having 8 to 22 carbon atoms.

Specific examples of the above organic lubricant compounds include butyl caprylate, octyl caprylate, ethyl laurate, butyl laurate, octyl laurate, ethylmyristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl alcohol and lauryl alcohol. Furthermore, so-called lubricating oil additives can also be used alone. Examples of such lubricating oil additives include antioxidants (for example, alkylphenols), rust inhibitors (for example, naphthenic acid, alkenylsuccinic acids, dilauryl phosphate), oiliness improvers (for example, rapeseed oil, lauryl alcohol), extreme pressure additives (for example, dibenzyl sulfide, tricresyl phosphate, tributyl phosphite), detergent-dispersants, viscosity index improvers, flowpoint depressants and anti-foaming agents. Such a lubricating oil additive is added in an amount of from 0.05 to 20 parts by weight per 100 parts by weight of the binder.

Examples of the antistatic agent which can be used in the present invention include electrically conductive powders such as graphite, carbon black and carbon black-grafted polymers natural surfactants such as saponin; nonionic surfactants such as alkylene oxide series surfactants, glycerol series surfactants, glycidol series surfactants, and EO adducts of polyhydric alcohols, polyhydric alcohol ethers or alkylphenols; cationic surfactants such as higher alkylamines, cyclic amines, hydantoin derivatives, amidoamines, ester-amides, quaternary ammonium salts, heterocyclic compounds such as pyridine, phosphoniums and sulfoniums; anionic surfactants having an acid group such as carboxylic acid, sulfonic acid, phosphoric acid, sulfuric ester group or phosphoric ester group; and ampholytic surfactants such as amino acids, aminosulfonic acids, sulfuric or phosphoric esters of aminoalcohols and alkylbetains.

Carbon black which can be used in the present invention include furnace black for rubbers, thermal black for rubbers, coloring black and acetylene black. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT HCC, HCF, MCF, LFF and RCF. Carbon blacks which fall under ASTM D-1765-82a can be used. The carbon black which can be used in the invention has an average particle size of from 10 to 1,000 m$\mu$ (electron microscope), a specific surface area as measured by the nitrogen adsorption method of from 1 to 800 m$^2$/g, a pH of from 6 to 11 (JIS K-6221, 1982), and an oil absorption as measured with dibutyl phthalate of from 10 to 400 ml/100 g (JIS K-6221,1982). According to the present invention, carbon black having a particle size of from 10 to 100 m$\mu$ is used to reduce the surface electric resistance of a coated film, and carbon black of from 50 to 1,000 m$\mu$ is used to adjust the strength of a coated film. Further, fine carbon black of 100 m$\mu$ or smaller is used to smooth the surface for reducing the spacing loss, while coarse carbon black of 50 m$\mu$ or larger is used to roughen the surface of a coated film to decrease its friction coefficient. Thus, the kind and amount of carbon black added are determined according to the purpose of a magnetic recording medium to be produced. Further, these carbon blacks may be surface-treated with a dispersant which will be described hereinafter, or may be grafted with a resin before use. Furthermore, carbon black whose surfaces have been partly graphitized may be used, which can be obtained by treating carbon black at a furnace temperature of 2,000° C. or more in production of the carbon black. Moreover, hollow carbon black may also be used as a specific type of carbon black. The amount of the carbon black added to the magnetic layer is preferably from 0.1 to 20 parts by weight per 100 parts by weight of the ferromagnetic particles. Carbon blacks which can be used in this invention are referred to, for example, in *Carbon Black*

*Binran (Handbook)* edited by Carbon Black Association, Japan (published in 1971).

Examples of organic solvents which can be used in dispersing, kneading and coating the above-described ingredients include ketone-type solvents such as acetone, methyl ethyl ketone, methyl isobutyl ketone, cyclohexanone, isophorone and tetrahydrofuran; alcohol-type solvents such as methanol, ethanol, propanol, butanol, isobutyl alcohol, isopropyl alcohol and methylcyclohexanol; ester-type solvents such as methyl acetate, ethyl acetate, butyl acetate, isobutyl acetate, isopropyl acetate, ethyl lactate, glycol acetate, and monoethyl ether; ether-type solvents such as ether, glycol dimethyl ether, glycol monoethyl ether and dioxane; aromatic hydrocarbons such as benzene, toluene, xylene, cresol, chloroenzene and styrene; chlorinated hydrocarbons such as methylene chloride, ethylene chloride, carbon tetrachloride, chloroform, ethylene chlorohydrin and dichlorobenzene; N,N-dimethyl-formaldehyde; and hexane. These solvents can be used alone or in combinations thereof at any desired proportions.

The method for kneading is not particularly limited, and the order of adding the components can be suitably determined. For preparing magnetic coating compositions, conventional kneading machines can be used. Examples of the kneading machines include a two-roll mill, a three-roll mill, a ball mill, a pebble mill, a tron mill, a sand grinder, a Szegvari attritor, a high-speed impeller, a dispersing machine, a high-speed stone mill, a high-speed impact mill, a disper, a kneader, a high-speed mixer, a ribbon blender, a Ko-Kneader, an intensive mixer, a tumbler, a blender, a disperser, a homogenizer, a single-screw extruder, a twin-screw extruder or an ultrasonic dispersing device. Details of kneading techniques are described in *Paint Flow and Pigment Dispersion* written by T. C. Patton, published by John Wiley & Sons in 1964; *Koqyo Zairyo (Industrial Materials)* vol. 25, 37 (1977), written by Shin-ichi Tanaka; and references cited therein. Further, reference is also made to U.S. Pat. Nos. 2,581,414 and 2,855,156 in this regard. According to a method described in the above-described literature and references cited therein, the necessary ingredients are kneaded and dispersed to prepare magnetic coating compositions.

The magnetic layer can be formed by dissolving the above-described ingredients in arbitrary combinations in organic solvents, coating the non-magnetic support with the resulting solution and drying it. The thickness of the non-magnetic support is about 2.5 to 100 μm, preferably 3 to 70 μm when the magnetic recording medium is used in the form of a tape.

Prior to performing coating, the support may be subjected to a corona discharge treatment, a plasma treatment, an undercoating treatment, a heat treatment, a dust-removing treatment, a metal deposition treatment or an alkali treatment. Examples of the support include those disclosed in, for example, West German Patent 3338854A, JP-A-59-116926, U.S. Pat. No. 4,388,368 and *Seni to Kogyo (Fibers and Industry)* vol. 31, pp. 50–55 (1975) written by Yukio Mitsuishi.

Methods for coating the magnetic layer on the support include air doctor coating, blade coating, air knife coating, squeeze coating, impregnation coating, reverse roll coating, transfer roll coating, gravure coating, kiss coating, cast coating, spray coating, and comparable techniques. These coating methods are explained in detail in *Coating Kogaku (Coating Industry)* pp. 253–277, published by Asakura Shoten, Japan, in Mar. 20, 1971.

If desired, the ferromagnetic powder in the magnetic layer, as coated on the support in the manner described above, is immediately subjected to an orientation treatment while drying, and the formed and oriented magnetic layer is then dried. In the above drying, the conveying speed of the support is generally 10 to 500 m/min and the drying temperature is regulated to the range of 20° to 120° C. If desired, the magnetic recording medium is subjected to a surface smoothing treatment such as calendering and cut into a desired shape, thus obtaining the desired magnetic recording medium of the present invention.

According to the present invention, the magnetic tape giving high output and high C/N according to S-VHS standard video tapes in particular can be produced without increasing the manufacturing cost thereof. In the present invention, the base film is used wherein $P_{10}$ of optical interference type three dimensional surface roughness is uniformly controlled to the range of 15 to 35 nm. Accordingly, the surface of the magnetic layer is not roughened so that the magnetic tape having excellent surface properties can be inexpensively produced without lowering yield. Further, the magnetic layer having high output and low noise in S-VHS systems can be produced by using a ferromagnetic powder comprising a Co-containing iron oxide having a coercive force of 850 to 1200 Oe and a crystallite size of 200 to 400 Å.

The present invention is now illustrated in greater detail by reference to the following example which, however, is not to be construed as limiting the invention in any way. In the example, parts are by weight unless otherwise specified.

EXAMPLE 1

A magnetic coating material having the following composition was prepared. Each of polyethylene terephthalate base films of 13 μm in thickness was coated with the magnetic coating material, calendered and split into a tape, thus obtaining each of ½" video tape sample Nos. 1 to 19.

| Magnetic Coating Material | |
|---|---|
| Co-containing ferromagnetic powder (acicular ratio: 8) | 300 parts |
| Phosphoric acid group-containing vinyl chloride copolymer | 30 parts |
| Polyurethane resin | 20 parts |
| Polyisocyanate | 10 parts |
| Carbon black | 8 parts |
| Abrasive ($\alpha$-$Al_2O_3$) | 5 parts |
| Lecithin | 3 parts |
| Lauric acid | 3 parts |
| Oleic acid | 3 parts |
| Butyl acetate | 100 parts |
| Methyl ethyl ketone | 150 parts |

The samples were different in the characteristics of the ferromagnetic powder and the base films from one another as indicated in the Table below.

The reproduced RF output and C/N of the resulting magnetic recording medium were determined.

With regard to the reproduced RF output, commercially available S-VHS deck and ferrite head were used and the reproduced RF output at a recording frequency of 0.83 μm (namely, output at 7 MHz) was measured. With regard to C/N, the ratio of the above reproduced RF output to noise was measured.

The reproduced RF output and C/N are relative values with the reproduced RF output of super XG-T-120 (manufactured by Fuji Photo Film Co., Ltd.) referenced to as 0 dB. A C/N value of +2.2 dB or higher at 7 MHz is a practically usable level for S-VHS tape usage.

The evaluation of the characteristics of the various base films used was made in the following manner.

(1) Manufacturing Yield: Yield when molded into a base film in each Example.

A roll of the base film directly wound up from a film-making machine is about 5 m wide and about 10,000 m long. When the film is fed to magnetic tape manufacturing stage, the film is previously slit into tapes (each being 10,000 m long by 1 m wide). The yield of the tape is lowered by the failure of wound-up form in this stage. The term "yield" as used herein refers to yield in the slit stage.

(2) Optical interference type three-dimensional surface roughness (Rmax, $P_{10}$)

Surface roughness within an area 250 μm square was measured (object lens, 40 × magnification) by using optical interference type three-dimensional roughness tester (trade name: TOPO-3D, manufactured by Wyko Corporation, Arizona, U.S.A.). The space between the uppermost height and the lowermost depths was referred to as Rmax (nm).

Further, heights were measured from the central plane (average height of the whole points) of the protrusions of 10 points were extracted in order of greatest height on the basis of information on the form of surface roughness to determine the average height $P_{10}$ (nm) of the protrusions of 10 points.

can be achieved. In the sample No. 11 wherein Rmax is outside the scope of the present invention, high C/N cannot be achieved, even though $P_{10}$ is within the scope of the present invention. In the sample Nos. 18 and 19 wherein $P_{10}$ of the back side of the non-magnetic support is larger than the upper limit defined by the present invention, the transfer of the roughness of the back side to the magnetic layer is greatly affected and high C/N cannot be achieved.

Accordingly, it can be understood that the magnetic tape produced by using the base film having $P_{10}$ and Rmax values within the range defined by the present invention gives high C/N without increasing the manufacturing cost thereof. The present invention has a remarkable effect on the magnetic tapes according to S-VHS standard in particular. It can also be expected that the present invention has a remarkable effect on the magnetic tapes according to conventional VHS, Beta standard, and the like.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer composed of ferromagnetic iron oxide powder dispersed in a binder, wherein a value of $P_{10}$ of optical interference type three dimensional surface roughness on the magnetic layer side of the non-magnetic support is in the range of 15 to 35 nm, Rmax/$P_{10}$ is not higher than 2.8 and $P_{10}$ of the opposite side to the magnetic layer side is

| | Ferromagnetic Iron Oxide Powder | | | Non-Magnetic Support | | | | Effect | | |
|---|---|---|---|---|---|---|---|---|---|---|
| | | | | Magnetic Layer Side | | | Back Side | Electromagnetic Properties | | Manufacturing Yield (%) |
| Sample No. | Hc Magnetic Layer (Oe) | Crystallite Size (Å) | Amount of Co (wt %) | $P_{10}$ (nm) | Rmax (nm) | Rmax/$P_{10}$ (nm) | $P_{10}$ (nm) | Output (dB) | C/N (dB) | |
| 1 | 900 | 300 | 6 | 10 | 19 | 1.9 | 11 | 3.6 | 3.1 | 35* |
| 2 | 900 | 300 | 6 | 15 | 23 | 1.5 | 16 | 3.6 | 3.1 | 75 |
| 3 | 900 | 300 | 6 | 22 | 46 | 2.1 | 20 | 2.8 | 2.5 | 92 |
| 4 | 900 | 300 | 6 | 25 | 45 | 1.8 | 24 | 3.0 | 2.7 | 93 |
| 5 | 900 | 300 | 6 | 31 | 81 | 2.6 | 33 | 2.7 | 2.4 | 96 |
| 6 | 900 | 300 | 6 | 35 | 84 | 2.4 | 34 | 2.7 | 2.4 | 95 |
| 7 | 900 | 300 | 6 | 40 | 88 | 2.2 | 42 | 2.2* | 2.0* | 98 |
| 8 | 900 | 300 | 6 | 24 | 29 | 1.2 | 24 | 3.2 | 2.9 | 91 |
| 9 | 900 | 300 | 6 | 24 | 43 | 1.8 | 25 | 3.0 | 2.7 | 93 |
| 10 | 900 | 300 | 6 | 24 | 65 | 2.7 | 24 | 2.7 | 2.4 | 95 |
| 11 | 900 | 300 | 6 | 24 | 72 | 3.0 | 23 | 2.2* | 2.0* | 95 |
| 12 | 850 | 300 | 3 | 24 | 43 | 1.8 | 25 | 3.0 | 2.7 | 93 |
| 13 | 1100 | 300 | 3 | 24 | 43 | 1.8 | 25 | 3.2 | 3.0 | 93 |
| 14 | 900 | 200 | 7 | 24 | 43 | 1.8 | 25 | 3.0 | 2.8 | 93 |
| 15 | 900 | 400 | 7 | 24 | 43 | 1.8 | 25 | 3.0 | 2.6 | 93 |
| 16 | 900 | 300 | 3 | 24 | 43 | 1.8 | 25 | 3.0 | 2.7 | 93 |
| 17 | 900 | 300 | 7 | 24 | 43 | 1.8 | 25 | 3.0 | 2.7 | 93 |
| 18 | 900 | 300 | 6 | 10 | 16 | 1.6 | 85 | 1.9* | 1.7* | 96 |
| 19 | 900 | 300 | 6 | 10 | 17 | 1.7 | 100 | 1.7* | 1.5* | 96 |

*lower than practically usable level.

It is clear from Table that the sample Nos. 2 to 6, 8 to 10 and 12 to 17 within the scope of the present invention give high C/N (at least 2.4 dB at λ=0.83 μm). On the other hand, C/N of the sample No. 7, wherein $P_{10}$ of the magnetic layer side of the non magnetic support is larger than the upper limit defined by the present invention, has a significantly smaller C/N. In the sample No. 1, wherein $P_{10}$ is smaller than the lower limit defined by the present invention, the manufacturing yield of the base film is low and hence the manufacturing cost of the magnetic tape is greatly increased, though high C/N also in the range of 15 to 35 nm, wherein $P_{10}$(nm) represents the difference between an average height of the protrusions of 10 apices extracted in order of greatest height within an area 250 μm square and an average height of all apices within the same 250 μm square area, and Rmax (nm) represents the difference between an uppermost height and a lowermost depth within the 250 μm square area.

2. The magnetic recording medium as in claim 1, wherein said ferromagnetic iron oxide powder is Co-containing iron oxide powder having a coercive force Hc of 850 to 1200 Oe and a crystallite size of 200 to 400 Å.

3. A magnetic recording medium as in claim 2, wherein the amount of cobalt is 3% to 7% by weight per 100 parts by weight of ferromagnetic iron oxide.

4. A magnetic recording medium as in claim 1, wherein the non-magnetic support is plastic and contains inert inorganic or organic particles.

5. A magnetic recording medium as in claim 4, wherein the inorganic or organic particles are α-silicon oxide, β-silicon oxide, benzoguanamine formaldehyde or polytetrafluoroethylene.

6. A magnetic recording medium as in claim 5, wherein the particles are comprised of a two-component system composed of 0.01 to 1.0 wt% of particles having a particle size 0.1 μm to 1 μm and 0.005 to 1.0 wt% of particles having a particle size of 0.3 μm to 5.0 μm.

7. A magnetic recording medium as in claim 1, wherein the binder is a thermoplastic resin, a thermosetting resin, a reactive resin or combinations thereof.

8. A magnetic recording medium as in claim 1, wherein the binder is a vinyl chloride copolymer having a polar group on a side chain.

9. A magnetic recording medium as in claim 1, wherein the amount of the binder is in the range of from 5 to 300 parts by weight per 100 parts by weight of the ferromagnetic iron oxide powder.

10. A magnetic recording medium as in claim 1, wherein the non-magnetic support has a thickness of about 2.5 μm to 100 μm.

11. A magnetic recording medium as in claim 1, wherein $P_{10}$ is in a range of 20 nm to 30 nm for both sides of the non-magnetic support.

12. A magnetic recording medium as in claim 1, wherein $R_{max}/P_{10}$ is in a range of 1.1 to 2.8.

* * * * *